United States Patent Office 3,538,027
Patented Nov. 3, 1970

3,538,027
POLYURETHANE COATING COMPOSITIONS
Werner Stein, Erkrath-Unterbach, Joachim Barnstorf, Hilden, Rheinland, and Uwe Ploog, Dusseldorf, Germany, assignors to Henkel & Cie, G.m.b.H., Dusseldorf, Germany, a corporation of Germany
No Drawing. Filed Oct. 12, 1967, Ser. No. 674,732
Claims priority, application Germany, Oct. 21, 1966, H 60,824; Dec. 23, 1966, H 61,391
Int. Cl. C08g 22/08
U.S. Cl. 260—18      9 Claims

ABSTRACT OF THE DISCLOSURE

Novel compositions for preparing flexible polyurethane coatings having a high chemical and mechanical resistance comprised of a polyisocyanate and a hydroxyl containing component formed by addition of an alkylene oxide to the adduct of a phenol compound with an ester having at least two straight and/or branched unsaturated hydrocarbon chains of 10 to 48 carbon atoms.

PRIOR ART

The use of lacquers comprised of polyvalent isocyanates and polyesters having free hydroxy groups prepared by esterification of dicarboxylic acids with di- or trihydroxy alcohols as protective coatings for a wide variety of materials is well known. However, the coatings prepared from these lacquers have various disadvantages in their resistance to hydrolysis due to the presence of the ester group. Lacquers comprised of polyvalent isocyanates and polyglycol ethers for forming coatings are also known but these coatings are also susceptible to aqueous chemical solutions.

Also, it is known that lacquers, stable at room temperatures, can be obtained from the reaction of an organic polyisocyanate with an aliphatic, cycloaliphatic or aralphatic monoalcohol and a polyamide, but such lacquers do not have any self-crosslinking, cold-hardenable coating agent. Air-drying lacquers derived from diisocyanates and unsaturated monoalcohols are also known, but these lacquers have to be hardened with the addition of specific organometallic compounds. In the last two instances, no compounds containing several hydroxyl groups are used. Finally, coating agents comprised of polyisocyanates and short chain alcohols such as butanediol and decamethyleneglycol are also known but these lacquer compositions are only slowly-hardenable at room temperature which is undesirable and therefore have to be hardened at elevated temperatures.

OBJECTS OF THE INVENTION

It is an object of the invention to provide novel lacquer compositions for forming polyurethane coatings which have a high chemical and mechanical resistance.

It is another object of the invention to provide novel coating compositions which have a sufficiently long pot life but are hardenable at room temperature within a relatively short time.

It is a further object of the invention to provide objects with a polyurethane coating which have a high chemical and mechanical resistance.

These and other objects and advantages of the invention will become obvious from the following detailed disclosure.

THE INVENTION

The novel compositions of the invention useful for preparing polyurethane coatings having a high chemical and mechanical resistance are comprised of an organic polyisocyanate and a hydroxyl containing compound selected from the group consisting of an adduct of a phenol and a carboxylic acid ester having at least two unsaturated straight and/or branched hydrocarbon chains of 10 to 48 carbon atoms and adducts thereof with an alkylene oxide selected from the group consisting of ethylene oxide and propylene oxide in an inert organic solvent, the ratio of isocyanate groups to hydroxyl groups being about 1.0 to 4.0.

The hydroxyl containing adducts can be advantageously prepared by reacting phenols or phenol derivatives with the carboxylic acid esters having at least two unsaturated, straight or branched hydrocarbon chains of 10 to 48 carbon atoms, or their alkoxylated derivatives in the presence of acid aluminum silicates as catalysts at a temperature of 100°–250° C. Particularly suitable catalysts are aluminum silicates, activated with mineral acids and having a pH value of 3–5 and the said silicates are used in an amount of 1–15% by weight of the reaction mixture. It is to be noted that if there are several double bonds in a straight carbon chain of the ester molecule and an excess of the phenol is used, only one mole of phenol is added onto this carbon chain. For branched chain products, such as carboxylic acid esters of Guerbet alcohols, one mole of phenol can be added to each individual carbon chain as long as the branched chains contain double bonds.

Suitable phenol compounds are aromatic alcohols which can be alkylated due to the presence of at least one exchangeable hydrogen atom on the aromatic ring. Examples of suitable phenols are phenol, polyhydroxy phenols such as pyrocatechol, pyrogallol, hydroquinone; alkylated phenols such as cresols, xylenols; halogenated phenols; naphthols such as α-naphthol; and phenols having several aromatic rings such as Bis-phenol A, o,o'-diphenol, etc.

Either the alcohol or the carboxylic acid components of the carboxylic acid ester used to form the phenol adduct may be unsaturated. When the acid component is a high molecular weight unsaturated fatty acid of 10 to 24 carbon atoms, the alcohol component may be a polyhydroxyl saturated or unsaturated alcohol of 2 to 24 carbon atoms or a high molecular weight unsaturated monoalcohol of 10 to 48 carbon atoms. When the alcohol component is a high molecular weight, unsaturated alcohol of 10 to 48 carbon atoms, the acid component may be a saturated or unsaturated polycarboxylic acid of 2 to 24 carbon atoms or an unsaturated monocarboxylic acid of 10 to 24 carbon atoms.

Examples of specific alcohol components are saturated and unsaturated polyhydroxyl compounds of 2 to 24 carbon atoms such as ethyleneglycol, 1,2-propanediol, 1,3-propanediol, 1,4-butanediol, 1,5-pentanediol, 1,6-hexanediol, glycerin, butanetriol-(1,2,3), trimethylol propane, erythrite, pentaerythrite, xylite, mannite, sorbite, erythrol, hexene-(3)-diol-(2,5), butene-(2)-triol-(1,2,4), cyclohexanediol-(1,4), o-xyleneglycol, etc. and unsaturated fatty alcohols such as decenol, dodecenol, hexadecenol, octadecenol or oleyl alcohol, octadecadiene-9,12-ol or linolenyl alcohol, octadecatriene-9,12,15-ol or linolenyl alcohol, etc. Particularly useful are unsaturated fatty alcohols derived from natural waxes or from unsaturated fatty acids of natural oils and fats which may be in pure form or mixtures. Examples of said alcohols are sojaocenol obtained by hydration of soy bean oil while preserving the double bonds which is predominantly unsaturated $C_{18}$ alcohols and Leinocenol obtained by hydration of linseed oil while preserving the double bonds. Also suitable are Guerbet alcohols of mono- or polyunsaturated fatty alcohols or mixtures thereof and particularly unsaturated alcohols derived from natural waxes or unsaturated fatty acids of natural fats and oils by the Guerbet reaction such as Guerbet alcohols of sojaocenol called Sojaguerbet alcohol or of Leinocenol called Leinguerbet alcohol. Also useful are the condensation products of the said alcohols with 1 to 12 moles of ethylene oxide and/or propylene oxide.

Examples of suitable carboxylic acid components of the esters are polycarboxylic acids of 2 to 24 carbon atoms such as oxalic acid, malonic acid, succinic acid, glutaric acid, adipic acid, sebacic acid, dimerized fatty acids, maleic acid, citraconic acid, aconitic acid, cyclohexane-1,4-dicarboxylic acid, camphoric acid, hexahydrophthalic acid, phthalic acid, terephthalic acid, trimellithic acid, trimesinic acid, pyromellithic acid and unsaturated monocarboxylic acid of 10 to 48 carbon atoms such as undecylenic acid, oleic acid, elaidic acid, erucic acid, brassidic acid, tall oil fatty acids, linoleic acid, eleostearic acid and linolenic acid. Unsaturated fatty acids obtained from natural waxes or oils and fats in pure form as well as admixed are preferred.

Examples of specific esters suitable for the preparation of the phenol adducts are the dioleic acid ester of ethylene glycol, diundeylenic acid ester of 1,2-propylene glycol, dilinoleic acid ester of hexamethylene glycol, trioleic acid ester of trimethylolpropane, tetraoleic acid ester of pentaerythrite, dioleic acid ester of o-xylylene glycol, dioleyl oxalate, dilinolenyl succinate, dilinolyl adipate, dioleyl maleate, oleyl oleate, dioleyl camphorate, dioleyl hexahydrophthalate, dioleyl phthalate, dilinolenyl trimesinate, etc. Preferred are natural waxes, fats and oils which have at least two long chain hydrocarbon radicals containing one or more double bonds such as sperm oil, rapeseed oil, sunflower oil, soya bean oil, poppyseed oil, cottonseed oil, teaseed oil, tall oil, linseed oil, ricinus oil, wood oil, as well as their conversion products such as ricinine oil and liquid constituents from solid fats such as tallow.

The hydroxyl containing adducts may also be condensed with 1 to 12 moles of ethylene oxide and/or propylene oxide which has the advantage of simultaneously varying the degree of flexibility and increasing the chemical resistance of the final polyurethane coatings. Preferably, the hydroxyl containing adducts are condensed with 1 to 6 moles of propylene oxide. High molar ratios of propylene oxide results in decreased chemical resistance. The said condensation products can be prepared by condensing a few moles of alkylene oxide with the unsaturated fatty alcohol, reacting the condensation product with the phenol and condensing a few more moles of the alkylene oxide with the resulting hydroxyl containing adduct.

The hydroxyl containing adducts should be as free as possible of non-reacted phenols or unsaturated fatty esters since the said starting materials disrupt chain formation and thus impair the preparation of the high molecular weight polyurethanes. Preferably the said adducts are the sole hydroxyl containing ingredient in the mixture, although up to 10% by weight of other known hydroxyl compounds such as trimethylolpropane, glycol, glycerine, etc., used in polyurethane coatings may be added thereto. Preferably 0.5 to 1.5% by weight of trimethylol propane is used.

Instead of reacting the phenol with the carboxylic acid ester, the adducts may be prepared by reacting are phenol compound with a high molecular weight, unsaturated branched or straight chain alcohol of 10 to 48 carbon atoms or its alkoxylated derivative then esterifying the product with a polycarboxylic acid of 2 to 24 carbon atoms or by reacting the phenol compound with an unsaturated fatty acid of 10 to 24 carbon atoms and esterifying the product with a polyhydroxyl alcohol of 2 to 4 carbon atoms. The products obtained by this variation of the invention are substantially the same as those obtained by reacting the phenol compound with carboxylic acid ester as described above. Moreover, the phenol-unsaturated alcohol adduct may be reacted with ethylene oxide or propylene oxide and the alkoxylated product may be esterified with a polycarboxylic acid.

The organic polyisocyanate used in the compositions are well known aliphatic and aromatic di- or polyisocyanates and their adducts with polyvalent low molecular weight alcohols. Examples of suitable polyisocyanates are hexamethyene diisocyanate, toluylene diisocyanate, p,p'-diphenyl diisocyanate, p,p'-diphenylmethane diisocyanate, p-phenylene diisocyanate, p,p',p''-triphenylmethane triisocyanate and adducts thereof such as 3 moles of toluylene diisocyanate with 1 mole of trimethylolpropane.

The compositions are preferably prepared by dissolving the hydroxyl containing adduct in an inert organic solvent such as ethyl acetate, benzene, toluene, xylene, methylene chloride, dioxane, diacetate of ethylene glycol, etc., and then adding the desired amount of polyisocyanate. Depending upon the specific components and the use of the final coating, stoichiometric, slight excess or slight deficiency of the polyisocyanate is used. An excess of polyisocyanate is preferred with alkylene oxide condensation products. The rate of the hardening process as well as the properties of the films can also be influenced by the use of catalysts. As suitable and well known catalysts, tertiary amines or their acid salts, such as triethylamine can be used in an amount of 0.001–0.1% by weight of the total mixture depending upon the type of the hydroxyl containing compound used and the use to be made of the coatings.

The compositions of the invention comprised of polyisocyanate, solvent, hydroxyl containing compound and optionally a low molecular weight polyhydroxyl compound and catalyst are compatible with pigments such as zinc chromate, titanium dioxide, talc, etc. The compositions can be applied to dry surfaces to be coated by spraying, painting or dipping in the usual manner. Depending upon the selection of the polyisocyanate component and the other components, they harden at room temperature in about 1–4 hours in a dust-dry manner. The lacquer layers obtain their final hardness in about 3–5 days. Of course, the hardening process can be effected at elevated temperature in a correspondingly shorter time.

The compositions of the invention provide well adhering coatings with a varying flexibility depending upon use on metals, wood, rubber, plastics, textiles, paper, etc. The coatings display outstanding abrasion resistance and gloss and uniform coverage and a remarkably high resistance to hydrolyzing chemicals such as aqueous alkaline solutions. The compositions which contain a hydroxyl containing adduct condensed with ethylene oxide and particularly propylene oxide have simultaneously a very high chemical resistance and good flexibility.

In the following examples there are described several preferred embodiments to illustrate the invention. However, it should be understood that the invention is not intended to be limited to the specific embodiments.

EXAMPLES

The adducts of a phenol and an unsaturated component of Table I were prepared in the following manner. The phenol and ester were introduced into a reaction vessel provided with a stirrer, a thermometer and a reflux condensor in the molar amounts shown in Table I with 5 or 10% by weight of Tonsil L 80 (a commercial fuller's earth having a pH of 3.8) previously dried at 120° C. for 3 hours as a catalyst. The resulting reaction mixture was heated to the temperature shown in Table I for 4 hours under an atmosphere of nitrogen and with vigorous stirring. The reaction mixture was then cooled to 100° C. and the catalyst was removed therefrom by vacuum filtration. The unreacted phenols and unsaturated alcohols were distilled off up to a temperature of 190° C. at 0.01 torr and the residue was the desired adduct having the hydroxyl number given in Table I. The percent yield was based on one mole of phenol to be added to each unsaturated hydrocarbon chain which means that for a 100% yield one mole of the phenol is added to each unsaturated hydrocarbon chain.

removed from the plates and stored for 3 days at 50° C. Each of the films prepared from the compositions of the inventions were clear, hard and flexible. The chemical resistance of the films was determined by hanging the strips in water, a 20% aqueous sodium hydroxide solution and 20% aqueous hydrochloric acid at 100° C. For com-

TABLE I

| | Starting materials | | Molar ratio | Percent of Tonsil L80 | Reaction temperature, °C. | Hydroxyl No. | Percent yield |
|---|---|---|---|---|---|---|---|
| | Phenol | Alcohol | | | | | |
| Example: | | | | | | | |
| 1 | Phenol | Dioleic acid ester of ethylene glycol | 6:1 | 10 | 180 | 116 | 95 |
| 2 | do | Dioleic acid ester of 1,2-propylene glycol | 6:1 | 10 | 180 | 132 | 98 |
| 3 | do | Sperm oil | 6:1 | 10 | 185 | 126 | 92 |
| 4 | do | Oleyl oleate | 6:1 | 5 | 166 | 140 | 100 |
| 5 | do | Sunflower oil | 9:1 | 5 | 180 | 103 | 93 |
| 6 | do | Rapeseed oil | 9:1 | 10 | 180 | 93 | 75 |
| 7 | Phenol [1] | Sojaocenol | 3:1 | 10 | 164 | 273 | 92 |
| 8 | Phenol [2] | Undecylene alcohol | 3:1 | 10 | 160 | 307 | 78 |
| 9 | Phenol [3] | Sojaocenol | 3:1 | 10 | 175 | 171 | 92 |

[1] The addition product was used in No. 18 of Table II.
[2] The adduct was esterified with sebacic acid to form the diester thereof having a Hydroxyl No. of 113 and an acid No. 8.1.
[3] The adduct was esterified with adipic acid to obtain the diester of adipic acid having a Hydroxyl No. of 122 and an acid No. of 0.6.

Several of the phenol-alcohol adducts of Table I were further condensed with ethylene oxide or propylene oxide according to the following procedure. The adducts were reacted at 100° C. with sufficient methanol solution containing 30% sodium methylate to have 0.2% by weight of sodium for the said adduct. The resulting clear, warm solution was heated at 60° C. under vacuum to distill off the methanol and then heated in an autoclave under a nitrogen atmosphere to the reaction temperature shown in Table II. Then the alkylene oxide was added in the molar ratios of Table II under a pressure of about 6 atmospheres after which the alkoxylated product was neutralized with concentrated formic acid and vacuum filtered while hot to remove the precipitated sodium formate.

parative purposes, films were prepared from compositions using as the hydroxyl containing compounds, Desmophen 800 (polyester of adipic acid, phthalic acid and a trihydroxy alcohol having a hydroxyl number of 298) and Desmophen 1100 (polyester of adipic acid, butylene glycol and di- and trihydroxyl alcohols having a hydroxyl number of 220).

The isocyanate solution of Table III was a 75% solution of the adduct of toluene diisocyanate and trimethylolpropane in a 3:1 molar ratio which is sold under the name Desmodur L 75.

The mechanical properties of all the clear films as determined by their tensile strength, impact resistance, elongation and abrasion was satisfactory and did not differ noticeably.

TABLE II

| | Adduct from Table I | Alkylene oxide | Molar ratio | Reaction conditions | | Hydroxyl Number |
|---|---|---|---|---|---|---|
| | | | | Time in hours | Temp., °C. | |
| Example: | | | | | | |
| 10 | 1 | Ethylene oxide | 1:3 | 2.5 | 148 | 74 |
| 11 | 2 | Propylene oxide | 1:2 | 4 | 150 | 111 |
| 12 | 4 | do | 1:6 | 5 | 148 | 105 |
| 13 | 4 | do | 1:12 | 10 | 148 | 91 |
| 14 | 5 | do | 1:3 | 5.5 | 140 | 110 |
| 15 | 5 | do | 1:10 | 3.5 | 140 | 96 |
| 16 | 6 | Ethylene oxide | 1:3 | 4.5 | 140 | 75 |
| 17 | 6 | Propylene oxide | 1:3 | 2.5 | 135 | 83 |
| 18 | [1] 7 | do | 1:1 | 5.5 | 139 | 223 |
| 19 | [2] 7 | do | 1:10 | 8 | 145 | 112 |
| 20 | [3] 8 | do | 1:3 | 5 | 145 | 158 |
| 21 | [4] 9 | do | 1:3 | 2 | 145 | 140 |
| 22 | [5] 9 | do | 1:5 | 4 | 140 | 158 |

[1] The adduct was esterified with adipic acid to form the diester thereof having a Hydroxyl No. of 112 and an Acid No. of 6.3.
[2] The propoxylated adduct was esterified with adipic acid to obtain the diester thereof having a Hydroxyl No. of 52 and an Acid No. of 7.3.
[3] Sebacic ester.
[4] Succinic ester.
[5] Adipic ester.

The adducts of Tables I and II were then dissolved in anhydrous ethyl acetate with or without the trimethylolpropane having a hydroxyl number of 1,219 and/or triethylamine indicated in Table III. The said solutions were then reacted with the isocyanate solutions indicated in Table I to obtain a 50% lacquer solution and the resulting solutions were allowed to stand for 1½ hours at room temperature after which the solutions were poured onto glass plates to form clear films. The plates were aged for 1 day at room temperature and the resulting films were The results are reported in Table III and the values used to report the results have the following definitions:

U=unchanged
F=colors dark
W=takes on a white color
Z=becomes decomposed
+=start
++=moderate
+++=intense
++++=very intense

TABLE III

| Example | Lacquer composition | NCO:OH | Pot life | Chemical resistance | 5 mins. | 15 mins. | 30 mins. | 1 hr. | 3 hrs. | 5 hrs. |
|---|---|---|---|---|---|---|---|---|---|---|
| 1 | 5 g. Demophen 800<br>10 g. isocyanate solution<br>9 g. ethyl acetate | 1.3:1 | 2 days | H$_2$O<br>NaOH 20%<br>HCl 20% | U<br>W++++<br>F+ | U<br>W++++<br>F+ | U<br>Z++<br>F+ | U | U | U |
| 2 | 5 g. Desmophen 1100<br>7.5 g. isocyanate solution<br>9 g. ethyl acetate | 1.3:1 | 2 days | H$_2$O<br>NaOH 20%<br>HCl 20% | U<br>W++++<br>F+ | W+<br>W++++<br>F+ | W+<br>Z++<br>F+ | W+ | W+ | W+ |
| 3 | 2.5 g. adduct No. 4<br>4 g. isocyanate solution<br>0.13 g. trimethylolpropane (1.2% by weight).<br>1 g. 1% triethylamine solution in ethyl acetate (0.09% by weight).<br>3.5 g. ethyl acetate | 2.2:1 | 8 hours | H$_2$O<br>NaOH 20%<br>HCl 20% | U<br>W++++<br>U | U<br>W++++<br>U | U<br>Z++<br>F+ | U<br>F++ | U | U |
| 4 | 2.5 g. adduct No. 5<br>3 g. isocyanate solution<br>1 g. 1% triethylamine solution (0.1% by weight).<br>3.5 g. ethyl acetate | 2.2:1 | 4 days | H$_2$O<br>NaOH 20%<br>HCl 20% | U<br>W++++<br>U | U<br>W++++<br>U | U<br>Z++<br>U | U<br>F+ | U<br>F+ | U |
| 5 | 2.5 g. adduct No. 10<br>3 g. isocyanate solution<br>4.5 g. ethyl acetate | 3.1:1 | >5 days | H$_2$O<br>NaOH 20%<br>HCl 20% | U<br>W+++<br>F+ | U<br>W+++<br>F+ | U<br>W++++<br>F+ | U<br>F+ | U<br>F+ | U<br>F+ |
| 6 | 2.5 g. adduct No. 11<br>2.2 g. isocyanate solution<br>1 g. 0.01% triethylamine solution (0.001% by weight).<br>3.5 g. ethyl acetate | 1.5:1 | >3 days | H$_2$O<br>NaOH 20%<br>HCl 20% | U<br>U<br>F+ | U<br>W++<br>F+ | U<br>W++++<br>F+ | F+ | F+ | F+ |
| 7 | 2.5 g. adduct No. 12<br>3 g. isocyanate solution<br>1 g. 0.1% triethylamine solution (0.01% by weight).<br>3.5 g. ethyl acetate | 2.2:1 | 5 days | H$_2$O<br>NaOH 20%<br>HCl 20% | U<br>U<br>F+ | U<br>W+<br>F+ | U<br>W++<br>F+ | U<br>W+++<br>F++ | U<br>F++ | U<br>F++ |
| 8 | 2.5 g. adduct No. 13<br>3 g. isocyante solution<br>1 g. 0.1% triethylamine solution (0.01% by weight).<br>3.5 g. ethyl acetate | 2.5:1 | >4 days | H$_2$O<br>NaOH 20%<br>HCl 20% | U<br>U<br>F+ | U<br>U<br>F+ | U<br>W+++<br>F+ | U<br>W++++<br>F+ | U<br>F+ | U<br>F+ |
| 9 | 2.5 g. adduct No. 14<br>3 g. isocyanate solution<br>1 g. 0.1% triethylamine solution (0.01% by weight).<br>3.5 g. ethyl acetate | 2.1:1 | >4 days | H$_2$O<br>NaOH 20%<br>HCl 20% | U<br>W+++<br>U | U<br>W+++<br>U | U<br>W+++<br>F+ | U<br>F+ | U<br>F+ | U |
| 10 | 2.5 g. adduct No. 15<br>3 g. isocyanate solution<br>1 g. 0.1% triethylamine solution (0.01% by weight).<br>3.5 g. ethyl acetate | 2.4:1 | 4 days | H$_2$O<br>NaOH 20%<br>HCl 20% | U<br>W+<br>F+ | U<br>W+++<br>F+ | U<br>W++++<br>F+ | U<br>F++ | U<br>F++ | U<br>F++ |
| 11 | 2.5 g. adduct No. 16<br>3 g. isocyanate solution<br>4.5 g. ethyl acetate | 3:1 | 22 hrs | H$_2$O<br>NaOH 20%<br>HCl 20% | U<br>W++++<br>F+ | U<br>W++++<br>F+ | U<br>W+++<br>F+ | U<br>F++ | U<br>F++ | U<br>F++ |
| 12 | 2.5 g. adduct No. 17<br>3 g. isocyanate solution<br>1 g. 1% triethylamine solution<br>3.5 g. ethyl acetate | 2.7:1 | 1½ days | H$_2$O<br>NaOH 20%<br>NCl 20% | U<br>U<br>U | U<br>W+<br>U | U<br>W++<br>U | U<br>W++<br>U | U<br>W+++<br>U | U<br>W++++<br>U |
| 13 | 1.25 g. adipic acid ester adduct No. 18<br>1.25 g. unesterified propylene oxide addition product—Sojaocenol-phenol with adduct No. 18.<br>3.0 g. isocyanate solution.<br>1 g. 0.01% triethylamine solution (0.001% by weight).<br>3.5 g. ethyl acetate | 1.3:1 | 6 days | H$_2$O<br>NaOH 20%<br>HCl 20% | U<br>U<br>U | U<br>W++<br>F+ | F+ | F++ | F+++ | F+++ |
| 14 | 2.5 g. adipic acid ester adduct No. 19<br>2.5 g. isocyanate solution<br>4.5 g. ethyl acetate | 3.6:1 | 4 days | H$_2$O<br>NaOH 20%<br>HCl 20% | U<br>U<br>F+ | U<br>U<br>F+ | U<br>W+<br>F+ | U<br>W++<br>F++ | U<br>W++<br>F++ | U<br>F+++ |
| 15 | 2.5 g. sebacic acid ester adduct No. 20<br>3.9 g. isocyanate solution<br>4.5 g. ethyl acetate | 2:1 | >6 days | H$_2$O<br>NaOH 20%<br>HCl 20% | U<br>U<br>U | U<br>W+<br>W+ | U<br>W+<br>W+ | W+<br>W++<br>W++ | W+<br>W++<br>W++ | W++<br>W++<br>W++ |
| 16 | 2.5 g. succinic acid ester adduct No. 21<br>4.1 g. isocyanate solution<br>4.5 g. ethyl acetate | 2.5:1 | 3 days | H$_2$O<br>NaOH 20%<br>HCl 20% | U<br>U<br>U | U<br>W+<br>W+ | U<br>W+<br>U | U<br>W++<br>W+ | U<br>W++<br>W+ | U<br>W+++<br>W+ |
| 17 | 2.5 g. adipic acid ester adduct No. 22<br>3.7 g. isocyanate solution<br>4.5 g. ethyl acetate | 1.9:1 | 3 days | H$_2$O<br>NaOH 20%<br>HCl 20% | U<br>U<br>U | U<br>W+<br>U | U<br>W+<br>W+ | U<br>W+++<br>F+ | W+<br>W+++<br>F+ | |

Various modifications of the compositions of the invention may be made without departing from the spirit or scope thereof and it is to be understood that the invention is to be limited only as defined in the appended claims.

We claim:
1. A composition for preparing polyurethane coatings having a high chemical and mechanical resistance comprising an inert organic solvent containing (A) an organic isocyanate and (B) a hydroxyl containing compound formed by condensing an adduct of a phenol and a carboxylic acid ester having at least two chains of the group consisting of unsaturated straight and branched hydrocarbon chains of 10 to 48 carbon atoms with 1 to 12 moles of an alkylene oxide selected from the group consisting of ethylene oxide and propylene oxide, the ratio of isocyanate groups to hydroxyl groups being about 1:1 and 4:1 and at least 2 moles of the phenol being used per mole of carboxylic acid ester.

2. The composition of claim 1 wherein the carboxylic acid ester is selected from the group consisting of natural oils, fats and waxes having at least two unsaturated hydrocarbon chains of 10 to 48 carbon atoms.

3. The composition of claim 1 wherein the carboxylic acid ester is the ester of an unsaturated fatty alcohol derived from a natural wax, fat or oil and the carboxylic acid is selected from the group consisting of unsaturated fatty acids of 10 to 24 carbon atoms and polycarboxylic acids of 2 to 24 carbon atoms.

4. The composition of claim 1 wherein the carboxylic acid ester is the ester of an unsaturated fatty acid of 10 to 24 carbon atoms derived from a natural fat, oil or wax and the alcohol is selected from the group consisting of an unsaturated fatty alcohol of 10 to 48 carbon atoms and a polyhydroxyl alcohol of 2 to 24 carbon atoms.

5. The composition of claim 1 which also contains 0.5 to 1.5% by weight of the total mixture of trimethylolpropane.

6. The composition of claim 1 which also contains 0.001 to 0.1% by weight of the total mixture of triethylamine catalyst.

7. A polyurethane coating having a high chemical and mechanical resistance formed by applying a composition of claim 1 to a substrata and curing the said composition.

8. A composition for preparing polyurethane coatings having a high chemical and mechanical resistance comprising an inert organic solvent containing (A) an organic isocyanate and (B) a hydroxyl containing compound formed by reacting a phenol with a compound selected from the group consisting of an unsaturated fatty alcohol of 10 to 48 carbon atoms and condensation products of said alcohols with 1 to 12 moles of a member selected from the group consisting of ethylene oxide and propylene oxide and esterifying the resulting phenolic alcohol with a polycarboxylic acid of 2 to 24 carbon atoms, the ratio of isocyanate groups to hydroxyl groups being about 1:1 to 4:1 and at least one mole of the phenol being used per mole of alcohol.

9. A composition for preparing polyurethane coatings having a high chemical and mechanical resistance comprising an inert organic solvent containing (A) an organic isocyanate and (B) a hydroxyl containing compound formed by reacting a phenol with an unsaturated fatty acid of 10 to 24 carbon atoms, esterifying the resulting phenolic acid with a polyhydroxyl alcohol of 2 to 24 carbon atoms and condensing the resulting ester with 1 to 6 moles of propylene oxide, the ratio of isocyanate groups to hydroxyl groups being about 1:1 to 4:1 and at least one mole of the phenol being used per mole of acid.

References Cited

UNITED STATES PATENTS

| | | | |
|---|---|---|---|
| 3,265,666 | 8/1966 | Brown | 260—410.5 X |
| 2,645,623 | 7/1953 | Hermann | 260—18 X |

DONALD E. CZAJA, Primary Examiner

C. W. IVY, Assistant Examiner

U.S. Cl. X.R.

117—161; 260—28, 47, 75, 77.5.